United States Patent [19]

Fox

[11] Patent Number: 4,979,529
[45] Date of Patent: Dec. 25, 1990

[54] VALVES

[76] Inventor: John M. Fox, 21 Ashfield Street, East, Brisbane, Queensland, 4169, Australia

[21] Appl. No.: 395,487

[22] Filed: Aug. 18, 1989

[51] Int. Cl.⁵ .......................................... F16K 31/126
[52] U.S. Cl. ...................................... 137/87; 137/362; 137/881
[58] Field of Search .................... 137/87, 362, 881; 134/104.2, 104.4

[56] References Cited

U.S. PATENT DOCUMENTS

3,240,222  3/1966  Heil ........................................ 137/87
4,039,005  8/1977  Clifford .................................. 137/883

Primary Examiner—Robert G. Nilson
Attorney, Agent, or Firm—Bauer & Schaffer

[57] ABSTRACT

A fluid supply system (10) for delivering a supply fluid to a washdown facility and for automatically diverting contaminated run-off to the sewer. The fluid supply system (10) includes a demand valve (13) connected in series in a supply line (11). The demand valve (13) is attached to a control line (14) which leads control fluid to a diversion valve (15) located in a sump (16). The demand valve (13) can operate either under upstream or downstream control to activate the diversion (15). In order to avoid inadvertent operation of the diversion valve the demand valve (13) includes a control valve member (33) and a pressure plate (32) which permits a small flow of fluid along the line such as may be experienced by a dripping tap. When the flow along the supply line exceeds a predetermined level the demand valve operates to divert control fluid to the diversion valve (15) to fill a variable volume chamber (48) and thereby unseat a diversion valve member (45) to open the diversion valve (15). The diversion valve (15) includes a needle valve (55) to control the bleed of fluid from the variable volume chamber (48) at a predetermined rate as the diversion valve closes so there is a time delay between shut off of the demand valve (13) and closure of the diversion valve (15). The time delay is to allow for excess run-off of waste fluid from the washdown facility.

12 Claims, 5 Drawing Sheets

VALVES

This invention relates to improvements in valves, in particular to improvements in valves suitable for use in the management and disposal of contaminated liquids such as waste water.

It has been common practice to allow industrial and domestic waste water to be disposed of via the sewers. A waste water inlet to the sewer is usually provided for this purpose. In some situations the waste water inlet may be exposed to stormwater. One such situation is an uncovered washdown facility for vehicles. In such a facility it is desirable to prevent stormwater from entering the sewer. Likewise it is desirable to prevent waste water contaminated with pollutants from the vehicle washdown from entering the stormwater drain and thereafter polluting creeks and streams.

U.S. Pat. No. 4,039,005 describes a flow diversion means for selectively directing waste water to the sewer or stormwater to the stormwater drain. The flow diversion means described includes a valve and sump arrangement. The sump has a sewer inlet located below a stormwater drain inlet. Liquid flowing into the sump preferentially flows to the sewer inlet. The valve includes a valve mechanism which operates in response to the supply of water to the washdown facility to selectively open or close the inlets. To this end two closure members are provided at each end of a lever. The lever is driven by inflatable bellows fed with water by a control line branching from the main supply line leading to the washdown facility. A needle valve can be employed to regulate the supply of water to the bellows. The bellows inflates when water is supplied to the washdown facility and deflates when the water supply is terminated. The supply line includes a main supply cock which is located upstream from the control line.

Thus, when the main cock is open water flows along the control line and inflates the bellows, the bellows move the lever and the stormwater drain inlet is closed while the sewer inlet is opened. When the main cock is closed the inflatable bellows deflates closing the sewer inlet and opening the stormwater drain inlet.

The main problem with this prior diversion means is that if the main supply cock is left permanently open the bellows could remain permanently inflated and all liquid entering the diversion means including stormwater would flow into the sewer. This situation can arise where a valve such as a tap or even a spray nozzle is attached to the supply line down stream of the control line and can be used to terminate supply independently of the main supply cock. It is therefore essential for proper operation of this diversion means that the supply line be controlled exclusively upstream of the control line.

Another known diversion means has been made the subject of Australian patent application no. 73471/87. This diversion means is similar to the diversion means described in U.S. Pat. No. 4,039,005 except the stormwater drain inlet remains open at all times. The diversion means of 73471/87 includes a valve mechanism housed in a first chamber forming the sump. The sewer inlet is located in the sump below the stormwater inlet so that incoming liquid flows preferentially to the normally closed sewer inlet. A silt trap basket is located below an inlet grid in a second chamber. Run-off liquid flowing through the grid must flow through the basket before entering the first chamber. Thus the basket operates as a filter removing debris from the liquid.

This latter diversion means is, as for the diversion means of U.S. Pat. No. 4,039,005 controlled by a control line and must also be used with a main supply line having a main supply cock upstream of the control line. Taps, adjustable nozzles or any other form of supply line control valve located downstream of the control line and operable independently of the main supply cock will result in the sewer inlet being permanently open.

Thus in both the known prior art diversion means downstream control of the main supply line can result in malfunction of the diversion means.

It would of course be desirable to have a diversion means that could be reliably controlled downstream by say a high pressure nozzle located at the end of a flexible hose. Such control is highly desirable in say a washdown facility particularly where on-off operation is envisaged at the end of the supply line.

It is therefore a principal object of the present invention to alleviate at least to some degree the problems associated with the aforementioned prior art.

In one aspect the invention resides in a fluid supply system for use in the management and disposal of contaminated fluids such as waste water comprising a demand valve having a control outlet and being connected via a supply inlet and a supply outlet in series in a fluid supply line, the control outlet being connected to the control inlet of a diversion valve, the diversion valve normally closing a waste water outlet, the demand valve being operable in response to a predetermined flow of supply fluid along the supply line to direct control fluid along the control line to cause the diversion valve to open the waste water outlet.

In another aspect, the present invention resides in a demand valve for controlling a waste water diversion valve, the demand valve comprising a demand valve body having a supply inlet and a supply outlet adapted for series connection in a fluid supply line, a control outlet adapted for connection to a diversion valve control line, a valve mechanism within said valve body having a control valve member, the control valve member being locatable between the supply inlet and the control outlet to permit flow of fluid between the supply inlet and the control outlet only in response to a predetermined flow of fluid between the supply inlet and the supply outlet.

The demand valve body can be of multiple part or unitary construction. Preferably it is of two part construction comprising an inlet part and an outlet part. The parts can be elongate or rotund and can be secured together by securing means. Preferably the parts are elongate and of arcuate transverse cross-section. The securing means can comprise co-operating members formed integrally with each part or can employ screws, bolts, or other suitable fixings to secure the parts together. Advantageously the parts include mating screw threaded flanges for securing the parts together.

The supply inlet can be located in one end or a side of the demand valve body and can be formed as a bore or aperture. The bore or aperture can be threaded internally or can be formed in an externally threaded projection. Alternatively the bore can be adapted for frictional engagement with a supply line conduit.

The supply outlet can have similar features to those outlined above for the supply inlet. Preferably the supply inlet and the supply outlet are arranged co-axially in the demand valve body to define between them a supply line passage through the demand valve body.

The control outlet can be located adjacent either the supply inlet or the supply outlet. The control outlet can include a control passage having an inner opening communicating with an outer opening near the exterior of the demand valve body. The outer opening of the control passage can be adapted for securing the demand valve to a control line. The inner opening of the control passage can open into the supply line passage within the demand valve body. The inner opening can include a control valve seat. The control valve seat can be located in a plane transverse to the direction of supply line flow through the supply line passage.

The valve mechanism can include a demand valve shaft. The demand valve shaft can extend along the supply line passage and the control valve member can be located at one end of the shaft. The valve mechanism can also include a control valve member biasing means. The control valve member biasing means can operate on the valve mechanism so that the control outlet is normally closed. The valve mechanism can include a supply line valve member movable in response to flow of fluid between the supply inlet and the supply outlet. The supply line valve member can be located on the demand valve shaft in the supply line passage downstream of the control valve member to intercept fluid flow through the supply line passage. The supply line valve member can be biased toward a supply line valve seat. Advantageously the supply line valve member is an annular pressure plate extending transversely of the valve shaft. In one form the pressure plate can be seated when the control valve member is seated. In another form the pressure plate can be spaced from the supply line valve seat when the control valve member is seated. The supply line valve seat can be of slightly greater diameter than the pressure plate to permit a predetermined minimum flow of fluid through the supply line passage between the pressure plate and the supply line valve seat. Alternatively, the pressure plate can seat to form a fluid tight seal. In this embodiment the pressure plate can include a plurality of apertures or holes to allow a predetermined minimum flow of fluid through the supply line passage. The aperture or hole size can be made adjustable by using a needle valve or camming closure to vary the aperture size. A supply line valve member biasing means can bias the supply line valve member toward the supply line valve seat. The control valve member and the supply line valve member can be biased by the same biasing means or can be biased independently. A biasing adjustment means can be used to vary the amount of bias on the supply line valve member and/or control line valve member.

In one form the biasing means is a spring preferably, a coil spring. The coil spring can extend along the valve shaft and downstream of the supply line valve member. The adjustment means can be a threaded sleeve extending along the shaft downstream of the valve member and being adjustable so as to vary the length of the coil spring. As mentioned above the control valve member can be located at the end of the demand valve shaft. The control valve member can be an arcuate washer located on the demand valve shaft transverse to the demand valve shaft axis. Preferably the control valve means washer is located up-stream of the supply line valve member.

The control valve seat can include a control valve member alignment means. The alignment means can be a housing into which the control valve member fits when seated. This is particularly advantageous where the control valve member and the supply line valve member are on a common demand valve shaft. In this situation the alignment means also serves to align the supply line valve member relative to the supply line valve seat.

In a further aspect the invention resides in a diversion valve for use in a sump of a waste water diversion means, the diversion valve comprising a diversion valve body having a fluid outlet, a movable diversion valve member, a diversion valve seat on which the diversion valve member can seat in order to close the diversion valve, and a variable volume chamber used to unseat or reseat the valve member and thereby allow or prevent the flow of fluid between the valve member and the valve seat when the valve is open or closed respectively, said chamber having a control line inlet for supplying fluid to the chamber to vary its volume, fluid bleed means for bleeding fluid from the chamber at a first flow rate when the valve is open and at a second increased flow rate as the valve member reseats.

The diversion valve body can be made from plastics or metal or any other suitable material. The diversion valve body can be of multiple part construction and the valve member can be formed as part of an upper body part which is movable with respect to a lower body part on which the diversion valve seat is formed. The upper body part can have a hollow interior containing the variable volume chamber. Advantageously the upper body part comprises a base section and a cap section which can be secured together. The base section and/or the cap section can have a recessed portion forming the hollow interior of the upper body when the base and cap sections are assembled.

The upper body part can be slidable on a diversion valve shaft as the volume of the variable volume chamber changes. The diversion valve shaft can be secured to and extend from the lower body part into the hollow interior where it engages a flexible wall of the variable volume chamber.

Advantageously the upper body part can be centred relative to the lower body part by centering means. The centering means can act on the diversion valve shaft to move the diversion valve shaft relative to the lower body part and thereby change the relative position of the upper body part and hence the diversion valve member with respect to the lower body part and hence the diversion valve seat when the upper body part slides on the diversion valve shaft. In a preferred form the centering means includes a housing in the lower body part through which the diversion valve shaft extends. The housing can be movable relative to the lower body part. In another form the housing is stationary and includes a grub screw or other adjustable means engagable with the shaft to change the shaft orientation relative to the housing and thereby its orientation relative to the lower body part.

The diversion valve shaft can pass through a bore section in the upper body part. The cross-sectional dimension of the bore can be larger than the cross-sectional dimension of the shaft so that fluid bled from the variable volume chamber can flow between the shaft and the bore. The bore cross-section can vary along the length of the bore so that as the upper body portion slides on the shaft the flow rate of fluid between the bore and the shaft changes.

The bore can have a lower narrow section to allow bleeding at the first fluid flow rate through the space between the bore and the shaft and an upper wider section to allow the second increased fluid flow rate through the space between the bore and the shaft. Preferably the relative lengths of the narrow and wider sections can be varied. Advantageously, the narrow bore section comprises a sleeve which can be a threaded sleeve threadedly engaged with the base section and the relative lengths of the narrow and wider bore sections can be varied by moving the sleeve in and out of the base section of the upper body part.

The diversion valve member is preferably made from a resilient material. The diversion valve member preferably has an annular resilient portion which forms an annular seal when operatively engaged with the diversion valve seat. Preferably the annular resilient portion is formed integrally with and as the periphery of a resilient diaphragm forming the flexible wall of the variable volume chamber. Preferably, the valve member is clamped between the base section and the cap section so that the diaphragm is within the hollow interior of the upper body part and the annular resilient portion is visible from the exterior of the upper body part. Preferably, the diaphragm has a central fixing hole to which the diversion valve shaft is attached to define a fluid tight seal between the diversion valve shaft and the diaphragm.

The diversion valve seat on the lower body part preferably defines an annular seal when operatively engaged with the diversion valve member. Advantageously, the diversion valve seat has a part tapered surface providing a wedge-fit for the valve member. Preferably the tapered surface is frusto conical.

The variable volume chamber is preferably located within the upper body part and comprises a fixed wall and a movable wall. The control inlet can communicate with the chamber through the base section or through the cap section. Preferably the resilient diaphragm forms the movable wall and the fixed wall comprises the recessed portion of the base section or cap section. Advantageously the variable volume chamber is between the diaphragm and the cap section and in this case the control inlet communicates with the chamber through the cap section.

The fluid bleed means can communicate with the variable volume chamber through the control inlet or through a bleed conduit. The bleed conduit is preferably an axial bore extending along the diversion valve shaft from its connection to the diaphragm to a bleed opening remote from the connection. An adjustable bleed valve can be located in the bleed conduit. Advantageously, the bleed valve is a needle valve and can be used to vary the bleed rate through the bleed opening in the diversion valve shaft. The bleed opening preferably communicates with the space between the shaft and the bore.

The bleed conduit can include a bleed pressure valve. The bleed pressure valve can operate in response to the pressure within the variable volume chamber exceeding a threshold value to close the bleed conduit. When the pressure in the chamber is below the predetermined threshold the bleed conduit remains open and fluid can bleed from the variable volume chamber. The bleed pressure valve can include a bleed pressure valve member and a bleed pressure valve seat on which the bleed pressure valve member seat to close the bleed pressure valve. The bleed pressure valve member can be biased away from the bleed pressured valve seat. The bias can be provided by a spring.

In order that the invention be more readily understood and be put into practical effect reference will now be made to the accompanying drawings and wherein.

Figure 1:
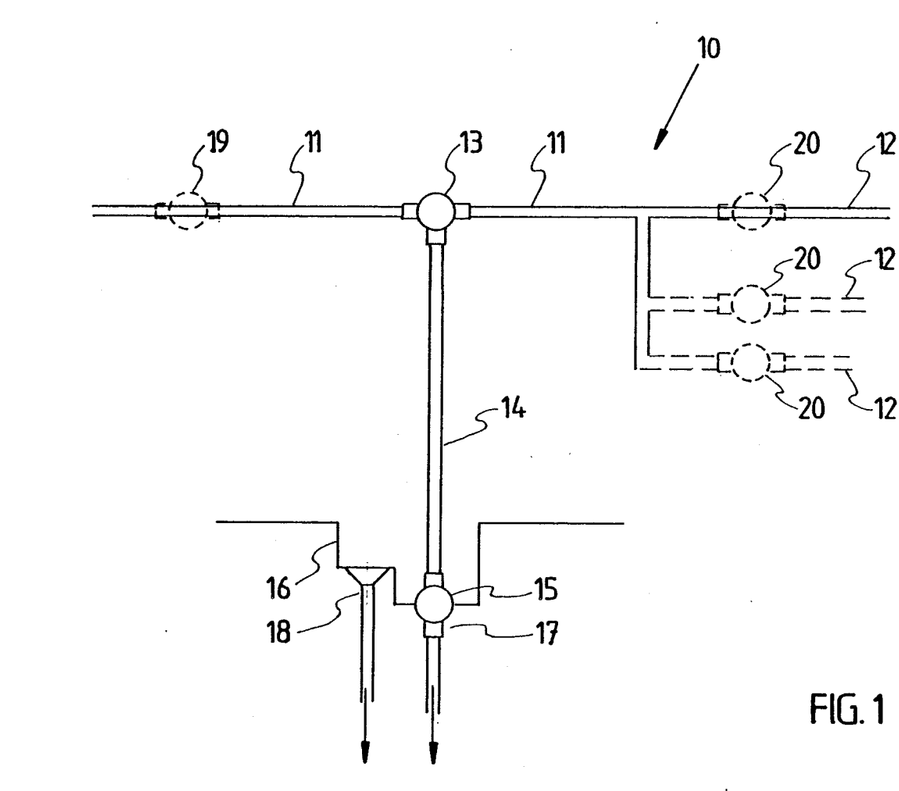
FIG. 1 is a schematic view illustrating a typical fluid supply system according to the present invention.

Referring to the drawings and initially to FIG. 1 there is illustrated in schematic view a typical fluid supply system 10 according to the present invention. The supply system 10 includes a main supply line 11 which can supply say water to a washdown facility through a number of hoses 12. A demand valve 13 is connected in series in the supply line 11. A control line 14 takes control fluid to a diversion valve 15 which is located in the bottom of a sump 16. The diversion valve maintains a sewer inlet 17 normally closed. At a level higher than the sewer inlet is a stormwater drain inlet 18. Fluid flowing into the sump preferentially flows to the sewer inlet 17.

The supply of water to the washdown facility can be controlled by an upstream main control cock 19 or by cocks 20 located downstream. The demand valve 13 operates in response to flow along the supply line to cause the diversion valve 17 to open the sewer inlet. The demand valve is responsive only to a predetermined flow of water along the supply line. Thus if one of cocks 19 or 20 is faulty resulting in say a very small continuous flow along the supply line 11 the demand valve will not direct control water to the diversion valve. This is particularly desirable because the sewer inlet should only be open when the washdown facility is actually being used.

Figure 2:
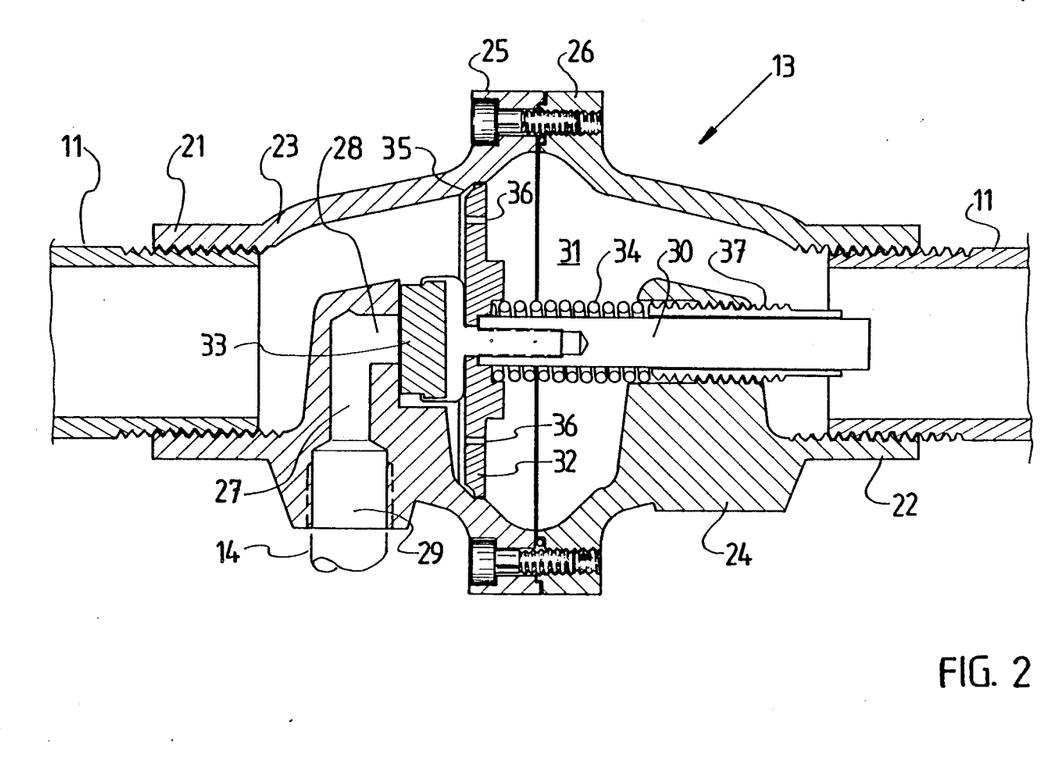
FIGS. 2 and 3 are cross-sectional views illustrating a preferred demand valve according to the present invention.
Figure 3:
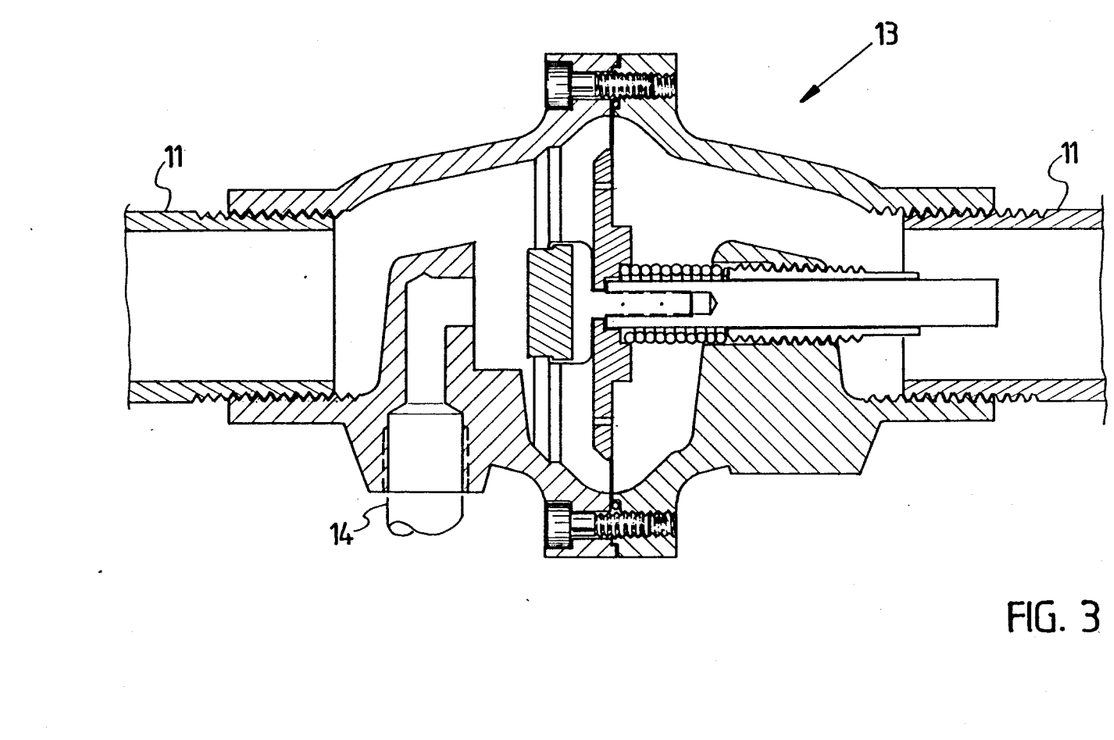

Referring now to FIGS. 2 and 3 there is illustrated the operation of a preferred demand valve 13. Like numerals have been used to illustrate like features. The demand valve 13 is connected in series in the supply line 11 via an internally threaded inlet bore 21 and an internally threaded outlet bore 22 in respective inlet and outlet parts 23 and 24. The inlet and outlet parts 23 and 24 are secured together by securing flanges 25 and 26. In this embodiment the demand valve 13 is made from brass.

A control outlet is defined by a control passage 27 having an inner opening at control valve seat 28 and an outer opening 29 on the exterior of the demand valve 13. The control line 14 is connected to the outer opening 29.

The demand valve 13 includes a valve mechanism which comprises in this case an axial demand valve shaft 30 extending and movable in the direction of supply line flow through a supply line passage 31, a supply line valve member 32 which in this case is a brass pressure plate, a control valve member 33, which in this case is a washer, and a biasing spring 34.

As shown in FIG. 2 the valve members 32 and 33 are illustrated seated on a control valve seat 28 and a supply line valve seat 35 respectively. In FIG. 3 the valve members are unseated and control water can flow along control line 14.

In the illustrated embodiment the supply line valve member 32 has a number of small holes 36 which allow a predetermined minimum flow of water through the demand valve before the supply line valve member 32 is unseated. As an alternative the holes can be omitted thus relying solely on bias afforded by spring 34 to determine the predetermined amount of flow required before supply line valve member 32 is unseated. This bias can be varied by rotation of sleeve 37 to change the effective length of spring 34 and thus the biasing force applied to the supply line valve member 32. In this form holes 36 are not required. In a still further alternative the supply line valve member 32 is spaced from the supply line valve seat when the control valve member 33 is seated to allow a predetermined minimum flow along the supply line. The preferred spacing can be in the range of 50–250 microns.

Referring now to FIGS. 4, 4A, 5 and 5A there is illustrated a preferred diversion valve 15 constructed in accordance with the present invention.

Figures 4, 4A:
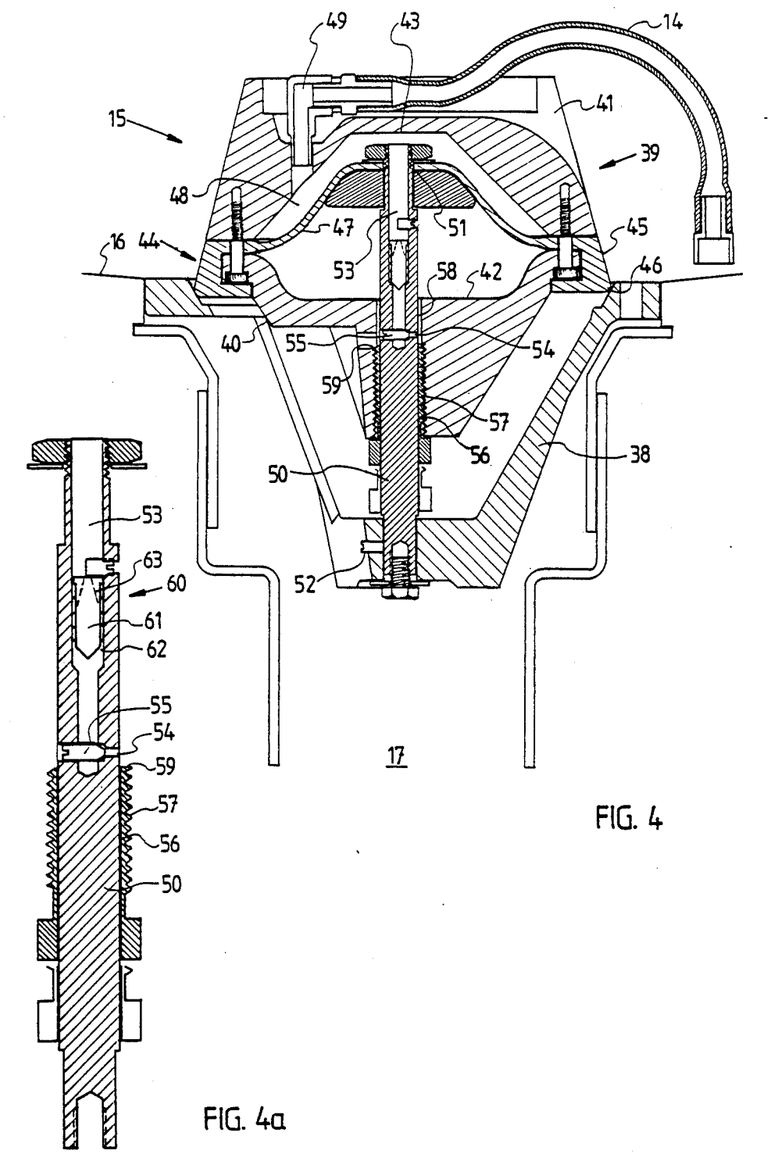
FIGS. 4 and 5 are cross-sectional views illustrating a preferred diversion valve according to the present invention.
FIGS. 4A and 5A are detailed views of respective parts of FIGS. 4 and 5.
Figures 5, 5A:
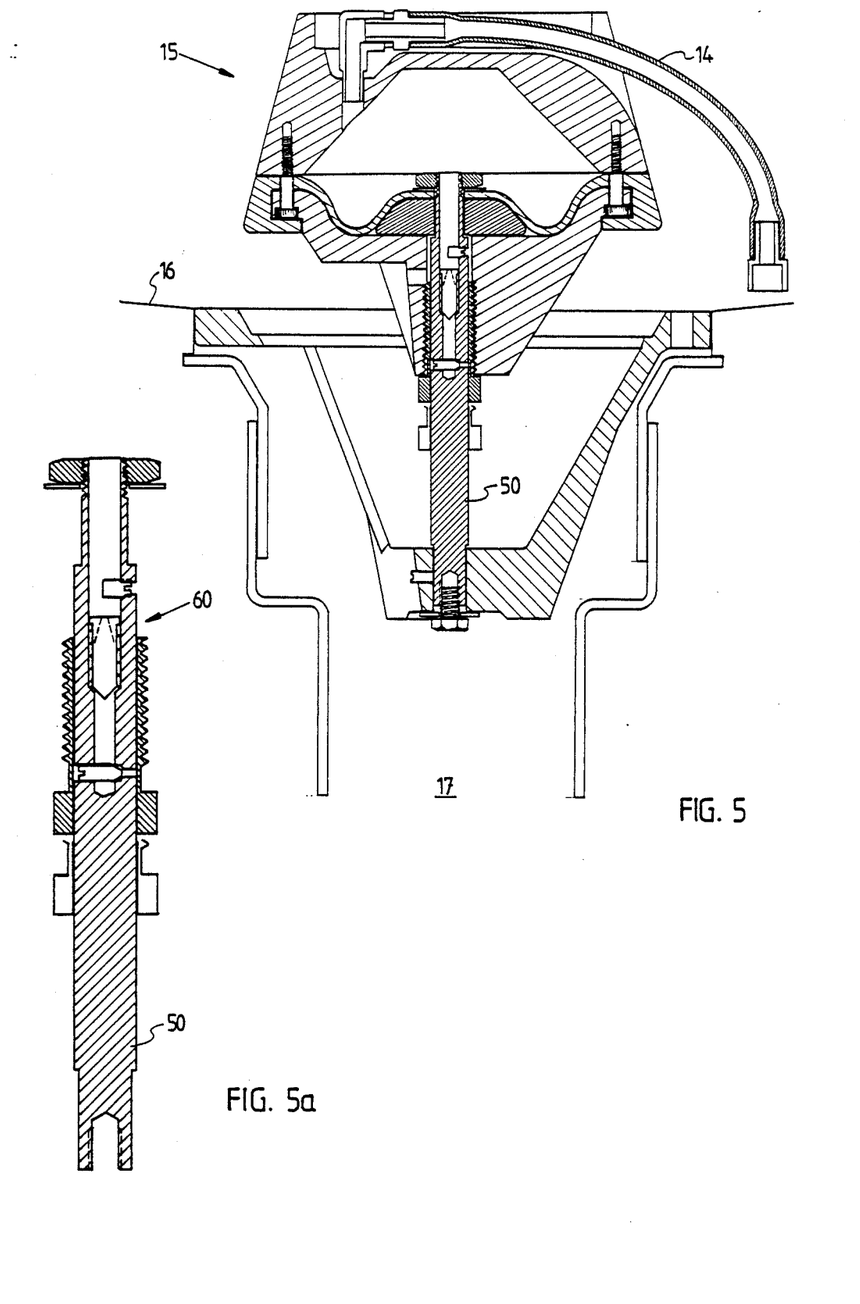

FIG. 4 illustrates the diversion valve closed and FIG. 5 illustrates the diversion valve open. The diversion valve 15 includes a lower body part 38 which is illustrated secured in the bottom of a sump 16 and a movable upper body part 39 comprising a base section 40 and a cap section 41. The base section 40 and cap section 41 include recesses 42 and 43. A diversion valve member 44 which in this case is of integral construction, has an outer visible periphery 45, which provides an annular seal when seated on diversion valve seat 46, and a diaphragm 47 which is clamped between the base section 40 and the cap section 41.

The diaphragm 47 and the recess 43 form the walls of a variable volume chamber 48 which in FIG. 4 is illustrated at its minimum volume and in FIG. 5 at its maximum volume. A control line inlet 49 communicates with the chamber 48. A diversion valve shaft 50 is fixed at one end to the lower body part 38 and at its free end to the diaphragm 47 through a central opening 51 in the diaphragm.

The angle of the diversion valve shaft can be varied relative to the lower body part by rotation of grub screw 52. Thus the seating of the diversion valve member periphery 45 on seat 46 can be centred to give an effective seal round the whole periphery 45.

Control water is bled from chamber 48 through a bleed conduit 53 extending axially along shaft 50 to a bleed opening 54. A needle valve 55 is adjustably positioned in the bleed opening 54. A bleed pressure valve 60 (best seen in FIGS. 4A and 5A) is located upstream of the needle valve 55 and comprises a bleed pressure valve member 61 mounted in biasing spring 62. Channels 63 are formed in the bleed pressure valve member so fluid can flow through the bleed pressure valve when open. The bleed pressure valve can be omitted. However enhanced operation can be achieved using this arrangement and this will be clarified below. The diversion valve shaft slides in a bore 56 in the base section 40. The space between the bore and the shaft allows the flow of bleed water through opening 54 and into the sewer inlet 17. The bore 56 includes a lower narrow section defined by sleeve 57 and a wider upper section 58 above the end 59 of the sleeve 57.

The sleeve 57 is threaded and can be screwed in and out of the base section 40 to vary the relative lengths of the lower and upper sections. The flow rate of bleed water is greater through the space between the upper section 58 of the bore and the shaft 50 than in the lower sections.

In operation the variable volume chamber 48 is filled with control water entering along control line 14 and the upper body 39 moves until it reaches the position illustrated in FIG. 5. If the bleed pressure valve is omitted, at all times control fluid bleeds through bleed opening 54. When the diversion valve is open (as in FIG. 5) fluid bleeds at a first rate determined by the space between the shaft 50 and the sleeve 57. When the control water along line 14 ceases to flow the chamber 48 begins to empty and the upper body part 39 begins to slide down shaft 50. When the bleed opening 54 reaches the top of sleeve 57 water bleeds at a new increased rate and continues at this rate until the diversion vale member periphery 45 is reseated on the diversion valve seat 46 in the position illustrated in FIG. 4.

It will be realised that the closing time of the diversion valve can be controlled using needle valve 55 or by screwing sleeve 57 in or out of the base section 40. In this way closing can be delayed for a preset time to allow the last contaminated run-off from the washdown facility to flow into the sewer after washdown has been completed.

It will be further realised that the accelerated closing of the diversion valve will enhance the seal between the valve member periphery 45 and the seat 46.

The demand valve and diversion valve described can be connected in the system of FIG. 1 and it will be appreciated that the diversion valve can be controlled downstream of the control line.

When the control water is initially applied to chamber 48 the bleed opening is located above the end 59 of sleeve 57. Thus there is a high bleed rate reducing the sensitivity of the diversion valve and creating a considerable time delay between operation of the demand valve and subsequent operation of the diversion valve.

The bleed pressure valve 60, of FIGS. 4A and 5A can be employed to reduce this time delay. The bleed pressure valve 60 responds to the pressure within chamber 48. It will be realised that a high pressure exists in chamber 48 when the demand valve control outlet is open and control fluid flows along line 14 compared with a lower pressure when the control outlet is closed. The bleed pressure valve is calibrated to operate on this differential. Thus the minimum pressure required to open the control outlet of the demand valve can correspond to the closing pressure of the bleed pressure valve. Thus as long as the demand valve control outlet is open the bleed pressure valve will be closed as in FIG. 5A. When the demand valve control outlet is closed the bleed pressure valve will open as in FIG. 4A and the chamber 48 will empty as described above.

Referring to all the drawings, in use, the diversion valve 15 is usually secured in and normally closes a sewer inlet in a sump 16. The sump usually includes a stormwater drain inlet 18 located above the sewer inlet 17 so that run-off preferentially flows to the sewer inlet 17. If the sewer inlet 17 is closed run-off fills the sump below the stormwater drain inlet 18 and then overflows into the stormwater drain inlet 18.

The diversion valve 15 of FIG. 4 is preassembled so that when closed an effective seal is made between the diversion valve member periphery 45 and the diversion valve seat 46. The seal can be optimised by rotation of the grub screw 52 to centre the upper body part 39 relative to the diversion valve seat 46. This effectively accounts for tolerance variations resulting from manufacture of the diversion valve components.

When a tap 20 of hose 12 is operated downstream of the demand valve 13 the demand for water creates a pressure difference across the supply valve member 32 of the demand valve causing it to move and thereby lift the control valve member 33 and control fluid flows out along the control line 14 to fill the chamber 48. As the control fluid fills the chamber 48 it flows into the bleed conduit 53 where the high pressure, which at this stage is above the bleed pressure valve 60 threshold, closes the bleed pressure valve 60. As the chamber fills, the diversion valve 15 opens and run-off waste water passes into the sewer 17. When the supply is terminated the demand valve 13 closes and the bleed pressure valve 60 opens in response to the pressure drop in chamber 48 and the diversion valve slowly closes at the first rate with a final accelerated closing at the second rate until the valve member periphery 45 reseats on diversion valve seat 46. Thus the predetermined closing time delay takes account of the last run-off and a positive seal is achieved as the valve member 45 reseats.

Many other modification and variation will be apparent to those skilled in the art without departing from the broad ambit and scope of the invention as defined in the following claims.

The claims defining the invention are as follows:

I claim:

1. A fluid supply system for use in the management and disposal of contaminated fluids such as waste water comprising, a demand valve having a control outlet and being connected via a supply inlet and a supply outlet in series in a fluid supply line, the control outlet being connected to the control inlet of a diversion valve, the diversion valve normally closing a waste water outlet, the demand valve being operable in response to a predetermined flow of supply fluid along the supply line to direct control fluid along the control line to cause the diversion valve to open the waste water outlet.

2. The system according to claim 1 wherein the demand valve includes a supply line passage between the supply inlet and the supply outlet and wherein the control outlet includes a control passage having an inner opening and an outer opening, the inner opening into the supply line passage within the demand valve body and having a control valve seat receiving a control valve member, the control valve seat being located in a plane transverse to the direction of supply line flow through the supply line passage so that the control valve member can seat on the control valve seat to close the inner opening to the control passage.

3. The system according to claim 2 including a demand valve shaft extending along and movable longitudinally in the direction of supply line flow through the supply line passage, the control valve member being located on the demand valve shaft, a supply line valve member being located on the demand valve shaft downstream of the control valve member, and having a supply line valve seat on which the supply line valve member can seat when the control valve member is seated on the control valve seat.

4. The system according to claim 3 wherein at least part of the supply line valve member is spaced from the supply line valve seat when the control valve member is seated on the control valve seat in order to allow the predetermined flow of fluid along the supply line.

5. The system according to claim 3 wherein said supply line valve member includes at least one hole to allow the predetermined flow of fluid along the supply line.

6. The system according to claim 3 including means biasing said control valve and supply line valve members toward their respective seats.

7. The system according to claim 6 wherein said biasing means is a coil spring and further includes bias adjustment means for varying the affective length of the coil spring to adjust the bias of said spring.

8. The system according to claim 1 wherein the diversion valve comprises a diversion valve body having a fluid outlet, a movable diversion valve member, a diversion valve seat on which the diversion valve member can seat in order to close the diversion valve, and a variable volume chamber used to unseat or reseat the valve member and thereby allow or prevent the flow of fluid between the valve member and the valve seat when the valve is open or closed, respectively, said chamber having a control line inlet for supplying fluid to the chamber to vary its volume, fluid bleed means for bleeding fluid from the chamber at a first flow rate when the valve is open and at a second increased flow rate as the valve member reseats.

9. The system according to claim 8 wherein the diversion valve body comprises an upper body part and a lower body part, said diversion valve seat being located on said lower body part and said upper body part being movable relative to said lower body part in response to changes in the volume of said variable volume chamber, said upper body part having a hollow interior and the diversion valve member including resilient diaphragm located within the hollow interior of said upper body part the diaphragm forming a movable wall of the variable volume chamber and being formed integral with a resilient peripheral portion of the upper body part, the resilient peripheral portion forming a seal with the diversion valve seat when the diversion valve is closed.

10. The system according to claim 9 including a diversion valve shaft on which the upper body part can slide as the volume of the chamber varies, the shaft extending through a bore in the upper body part and having a free end secured to said resilient diaphragm, said shaft having an axial bore through which fluid can be bled from said chamber.

11. The system according to claim 8 wherein the bleed means includes bleed pressure valve openable to bleed fluid from the variable volume chamber only when the fluid pressure within the chamber is below a predetermined pressure.

12. The system according to claim 11 wherein said bleed pressure valve is located in a bleed conduit communicating with said chamber an adjustable valve extending into said conduit and being operable to vary the rate at which fluid is bled from said chamber.

* * * * *

UNITED STATES PATENT AND TRADEMARK OFFICE
CERTIFICATE OF CORRECTION

PATENT NO. : 4,979,529

DATED : December 25, 1990

INVENTOR(S) : John Maurice Fox

It is certified that error appears in the above-identified patent and that said Letters Patent is hereby corrected as shown below:

Column 9, line 45 after "inner opening" insert --opening--

Column 10, line 15 change "affective" to --effective-- line 38 after "including" insert --a--
line 40 after "part" insert --,--
line 53 change "openable" to --operable--

Signed and Sealed this

Twenty-first Day of April, 1992

Attest:

HARRY F. MANBECK, JR.

*Attesting Officer*   Commissioner of Patents and Trademarks